No. 695,900. Patented Mar. 25, 1902.
M. C. BEEBE.
SYSTEM OF DISTRIBUTION FOR ELECTRIC LAMPS CONNECTED IN SERIES.
(Application filed Oct. 27, 1900.)
(No Model.)

WITNESSES:
C. L. Belcher
Birney Hines

INVENTOR
Murray C. Beebe
BY
Wesley E. Carr
ATTORNEY.

UNITED STATES PATENT OFFICE.

MURRAY C. BEEBE, OF PITTSBURG, PENNSYLVANIA, ASSIGNOR TO GEORGE WESTINGHOUSE, OF PITTSBURG, PENNSYLVANIA.

SYSTEM OF DISTRIBUTION FOR ELECTRIC LAMPS CONNECTED IN SERIES.

SPECIFICATION forming part of Letters Patent No. 695,900, dated March 25, 1902.

Application filed October 27, 1900. Serial No. 34,639. (No model.)

*To all whom it may concern:*

Be it known that I, MURRAY C. BEEBE, a citizen of the United States, residing at Pittsburg, in the county of Allegheny and State of Pennsylvania, have invented a new and useful Improvement in Systems of Distribution for Electric Lamps Connected in Series, of which the following is a specification.

My invention relates to electric lamps of the class in which the light-giving member is a conductor only when heated; and it has for its object to provide a combination or arrangement of apparatus for operating a plurality of such lamps in series either from a constant-current or a constant-potential circuit.

With this end in view I have devised the means shown in the accompanying drawings, in which—

Figure 1:
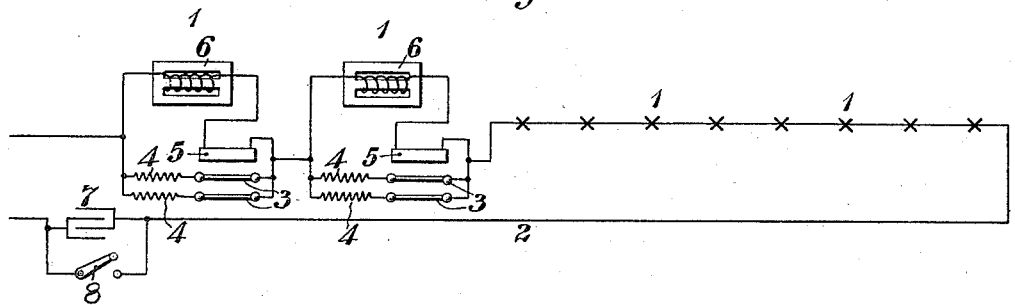
Figure 2:
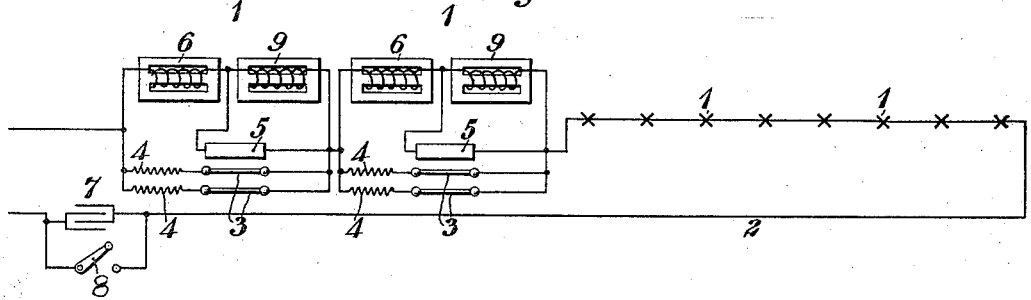

Figures 1 and 2 are diagrams illustrating different forms of my invention.

Referring first to Fig. 1, the lamps 1 are connected in series in a circuit 2, which may be supplied with alternating-current electrical energy from a suitable source either the current or the potential of which is constant. The glower or glowers 3, of which any suitable number may be employed, are severally connected with ballast-resistances 4 and are heated to conducting temperature by means of an electric heater 5, as is usual in lamps of this type. In order to maintain the normal circuit conditions so far as possible in case the glower or glowers of one or more of the lamps become impaired or destroyed, I provide each lamp with an inductive resistance-coil 6, which, as shown, is connected in series with the heater. It has long been usual to employ inductive resistance-coils in this manner in connection with incandescent lamps which were operated in series, and hence their function here will be readily understood. In the operation of this system the heaters and resistance-coils take the entire current, while the glowers are non-conductive, and consequently a higher voltage is required during this period than is necessary for operating the lamps after the glowers become conductive. This arrangement will operate satisfactorily in a constant-current circuit without auxiliary apparatus; but in order that it may be utilized for operating a series of lamps connected across constant-potential mains I provide the circuit 2 with a condenser 7, the capacity of which may be so adjusted as to neutralize the impedance offered by the inductive resistances 6 during the operation of the heaters. The condition of the circuit is thus made virtually the same so far as the voltage is concerned as if only the heaters were included in circuit. When the glowers become conductive, the condenser will still offer some impedance if retained in circuit, and hence for normal running I have provided a switch 8, which may be closed, so as to provide a path around the condenser during the operation of the glowers.

This system is obviously not entirely automatic. If an automatic system is desired, the capacity of the condenser may be so adjusted as to only about half neutralize the impedance of the coil 6. If this adjustment be adopted, it will not be necessary to remove the condenser from the circuit when the glowers become conductive.

The arrangement shown in Fig. 2 is substantially the same as that shown in Fig. 1 except for the provision of a second resistance-coil 9 for each lamp, this coil being normally connected in shunt to the heater. This coil 9 is provided in order that the desired conditions as regards the resistance of the circuit may be maintained in case the heater is burned out or otherwise destroyed. So long as the heater is unimpaired and preserves its circuit connections the coil 9 is unnecessary and does no work; but any injury to the heater which impairs or destroys its conductivity obviously compels current to traverse the coil 9, provided the current is not all taken by the glower or glowers of the lamp. The structure and operation of the other devices shown in Fig. 2 are the same as in Fig. 1, and since the same reference-numerals are employed in the two figures a repetition of the description already given will be unnecessary.

I claim as my invention—

1. In a system of distribution for electric lamps, the combination with a plurality of glowers or sets of glowers connected in series, of a plurality of heaters respectively in shunt to the glowers or sets of glowers and two impedance-bodies for each lamp one of which is connected in series and the other in shunt with the heater.

2. In a system of electrical distribution, a plurality of lamps of the type described, each of which comprises a glower or set of glowers, a heater in shunt thereto and two impedance-bodies one of which is in series and the other in shunt with the heater.

3. In a system of electrical distribution, a plurality of lamps of the type described, each of which comprises a glower or set of glowers, a heater in shunt thereto, and an impedance-body in series with the heater, in combination with a condenser in series with the lamps.

4. In a system of electrical distribution, a plurality of lamps of the type described, each of which comprises a glower or set of glowers, a heater in shunt thereto, an impedance-body in shunt to the heater and an impedance-body in series therewith, in combination with a condenser in series with the lamps.

5. In a system of electrical distribution, a plurality of lamps each of which comprises a glower or set of glowers, a heater in shunt thereto and an impedance-body in series with the heater, in combination with a neutralizing means for the impedance-bodies connected in series with the lamps.

In testimony whereof I have hereunto subscribed my name this 19th day of October, 1900.

MURRAY C. BEEBE.

Witnesses:
EDWARD BENNETT,
HUGH A. CROOKS.